United States Patent
Feng et al.

(10) Patent No.: US 8,346,028 B2
(45) Date of Patent: Jan. 1, 2013

(54) OPTICAL DEVICE HAVING MODULATOR EMPLOYING HORIZONTAL ELECTRICAL FIELD

(75) Inventors: Dazeng Feng, Arcadia, CA (US); Po Dong, Arcadia, CA (US); Ning-Ning Feng, Arcadia, CA (US); Mehdi Asghari, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 251 days.

(21) Appl. No.: 12/653,547

(22) Filed: Dec. 15, 2009

(65) Prior Publication Data

US 2011/0142390 A1    Jun. 16, 2011

(51) Int. Cl.
   *G02F 1/295* (2006.01)
(52) U.S. Cl. .............. 385/8; 385/2; 359/254; 359/315
(58) Field of Classification Search .......... 385/2, 8; 359/254, 315
   See application file for complete search history.

(56) References Cited

U.S. PATENT DOCUMENTS

| | | | |
|---|---|---|---|
| 5,757,986 A * | 5/1998 | Crampton et al. | 385/2 |
| 5,811,838 A * | 9/1998 | Inomoto | 257/80 |
| 7,239,762 B2 | 7/2007 | Kimerling | |
| 7,603,016 B1 * | 10/2009 | Soref | 385/129 |
| 8,009,937 B2 * | 8/2011 | Mathai et al. | 385/2 |
| 2001/0053165 A1 | 12/2001 | Wang | |
| 2003/0016896 A1 * | 1/2003 | Azarbar et al. | 385/2 |
| 2005/0025417 A1 * | 2/2005 | Hallemeier et al. | 385/28 |
| 2007/0070309 A1 * | 3/2007 | Stern | 353/119 |

OTHER PUBLICATIONS

Feng, D., et al., "High-speed Ge photodetector monolithically integrated with large cross-section SOI waveguide", Applied Physics Letters, 95, 261105 (2009).*
Dehlinger, G., et al., "High-speed Germanium-on-SOI lateral PIN Photodiodes", IEEE Photonics Technology Letters, vol. 16, No. 11, 2547-9 (2004).*
Xu, Q., et al., "Micrometre-scale silicon electro-optic modulator", Nature, vol. 435, 325-7 (2005).*
Liu, et al., "Waveguide-integrated, ultralow-energy GeSi electro-absorption modulators," Nature Photonics, vol. 2, pp. 433-437 (Jul. 2008).
Liu, et al., "Design of monolithically integrated GeSi electro-absorption modulators and photodetectors on an SOI platform," Optics Express, vol. 15, No. 2, pp. 623-628 (Jan. 22, 2007).
The International Search Report and Written Opinion of the International Search Authority as extracted from PCT/US2010/002959.

* cited by examiner

*Primary Examiner* — Charlie Peng
(74) *Attorney, Agent, or Firm* — Gavrilovich, Dodd & Lindsey, LLP

(57) ABSTRACT

The optical device includes a waveguide on a base. The device also includes a modulator on the base. The modulator includes an electro-absorption medium configured to receive a light signal from the waveguide. The modulator also includes field sources for generating an electrical field in the electro-absorption medium. The electro-absorption medium is a medium in which the Franz-Keldysh effect occurs in response to the formation of the electrical field in the electro-absorption medium. The field sources are configured so the electrical field is substantially parallel to the base.

16 Claims, 9 Drawing Sheets

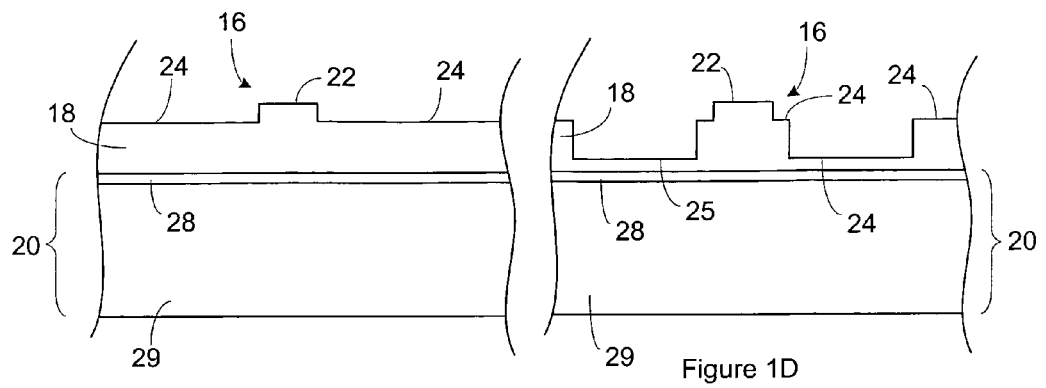
Figure 1C
Figure 1D
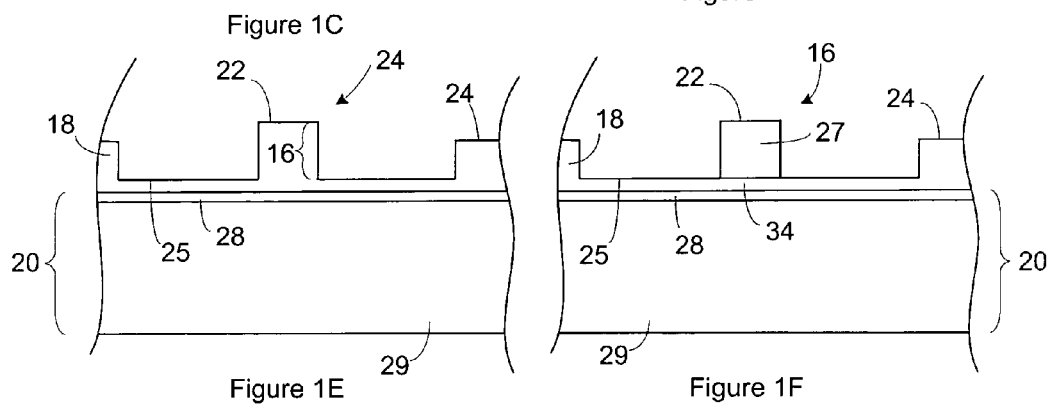
Figure 1E
Figure 1F
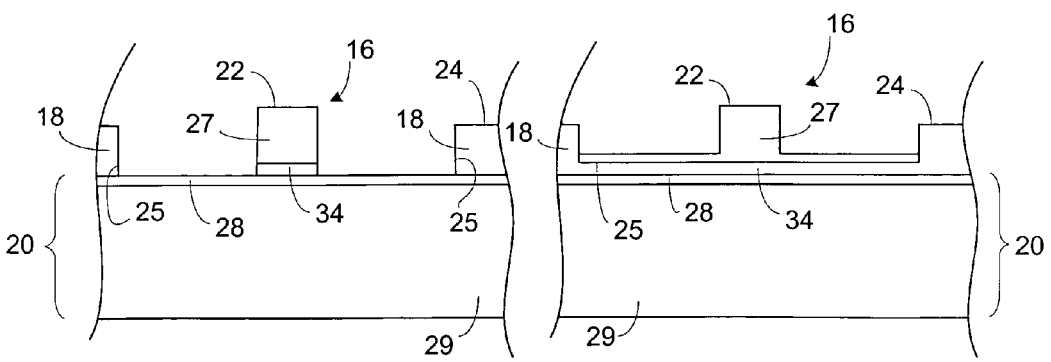
Figure 1G
Figure 1H

OPTICAL DEVICE HAVING MODULATOR EMPLOYING HORIZONTAL ELECTRICAL FIELD

FIELD

The present invention relates to optical devices and more particularly to devices having optical modulators.

BACKGROUND

The use of optical and/or optoelectronic devices is increasing in communications applications. These devices can include modulators for phase and/or intensity modulating light signals. These modulators have been able to achieve adequate speeds when the waveguides have a cross-section with sub-micron dimensions. However, many communications applications employ larger waveguides. When these modulators are used with larger waveguides, they generally lose speed as a result of the need for carriers to travel through the larger dimensions of the waveguide.

For the above reasons, there is a need for modulators that are suitable for use with larger waveguides.

SUMMARY

An optical device includes a waveguide on a base. The device also includes a modulator on the base. The modulator includes an electro-absorption medium configured to receive a light signal from the waveguide. The modulator also includes field sources for generating an electrical field in the electro-absorption medium. The electro-absorption medium is a medium in which the Franz-Keldysh effect occurs in response to the formation of the electrical field in the electro-absorption medium. The field sources are configured so the electrical field is substantially parallel to the base.

One embodiment of the device includes an optical waveguide on a base. The waveguide is configured to guide a light signal through a light-transmitting medium. A modulator is also positioned on the base. The modulator including a ridge extending from slab regions. The slab regions are positioned on opposing sides of the ridge. An electro-absorption medium is positioned to receive at least a portion of the light signal from the light-transmitting medium included in the waveguide. The electro-absorption medium is included in the ridge and also in the slab regions. The electro-absorption medium includes doped regions positioned such that application of a bias across the doped regions forms an electrical field in the electro-absorption medium included in the ridge.

Another embodiment of the optical device includes an optical waveguide on a base. The waveguide is configured to guide a light signal through a light-transmitting medium. A modulator is positioned on the base and includes electro-absorption medium configured to receive the light signal from the waveguide. The electro-absorption medium has lateral sides that are each positioned between a top side and a bottom side with the bottom side being between the base and the top side. The light-transmitting medium and the electro-absorption medium are different materials. The modulator also includes field sources configured to serve as sources of an electrical field in the electro-absorption medium. The field sources each contact one of the lateral sides and the lateral sides that are contacted by the field sources are on opposing sides of the electro-absorption medium.

BRIEF DESCRIPTION OF THE FIGURES

FIG. 1A through FIG. 1J illustrate an optical device having an optical modulator configured. The modulator includes field sources that are configured to generate a substantially horizontal electrical field in an electro-absorption medium. The device illustrated in FIG. 1A through FIG. 1J employs doped regions of the electro-absorption medium as the field sources.

FIG. 1A is a perspective view of the device.

FIG. 1B is a topview of the portion of the optical device shown in FIG. 1A that includes the optical modulator.

FIG. 1C is a cross-section of the device shown in FIG. 1A taken along the line labeled C.

FIG. 1D is a cross-section of the optical device shown in FIG. 1A taken along the line labeled D.

FIG. 1E is a cross-section of the optical device shown in FIG. 1A taken along the line labeled E.

FIG. 1F is a cross-section of the optical device shown in FIG. 1A taken along the line labeled F.

FIG. 1G is a cross-section of the optical device shown in FIG. 1A taken along the line labeled F.

FIG. 1H is a cross-section of the optical device shown in FIG. 1A taken along the line labeled F. The embodiments shown in FIG. 1F, FIG. 1G, and FIG. 1H are alternative embodiments.

FIG. 1J is a cross-section of the optical device shown in FIG. 1A taken along the line labeled J. The cross section is through a modulator constructed on a waveguide having a structure according to FIG. 1F.

DESCRIPTION

The optical device includes a waveguide positioned on a base. A portion of the waveguide includes an electro-absorption medium. The waveguide is configured such that light signals guided through the waveguide are received in the electro-absorption medium. The device includes field sources in contact with the electro-absorption medium. During operation of the modulator, an electrical field can be applied to the field sources to form an electrical field in the electro-absorption medium. The electro-absorption medium can be a medium in which the Franz-Keldysh effect occurs. As a result, application of the electrical field to the electro-absorption medium causes an increase in the absorption of light by the electro-absorption medium. The electrical field can be tuned so as to modulate the level of absorption of the light signals. Further, the electrical field needed to take advantage of the Franz-Keldysh effect generally does not involve excitation of carriers by the electric field. Since the formation and tuning of the electrical field is not dependent on the movement of carriers, the modulator can provide high speed modulation. For instance, in some instance, the modulator can provide modulation on the order of 40 GHz.

Additionally, the field sources can be arranged such that the resulting electrical field is substantially parallel to the base or is substantially horizontal. For instance, the field sources can be positioned on the lateral sides of the electro-absorption medium. Since the electrical field can be substantially parallel to the base, narrowing the width of the electro-absorption medium increases the speed of the modulator. As a result, the width of the waveguide can be horizontally tapered in order to increase the modulation speed. Further, this increase in modulation speed can be achieved without reducing the height of the electro-absorption medium. As a result, the increased speed can be achieved without the use of vertical tapers that are often associated with optical loss and fabrication challenges. Since the modulator speed can be increased by using a horizontal taper but without a vertical taper, the modulator can provide acceptable modulation speeds for waveguides having larger dimensions.

Figure 1A:
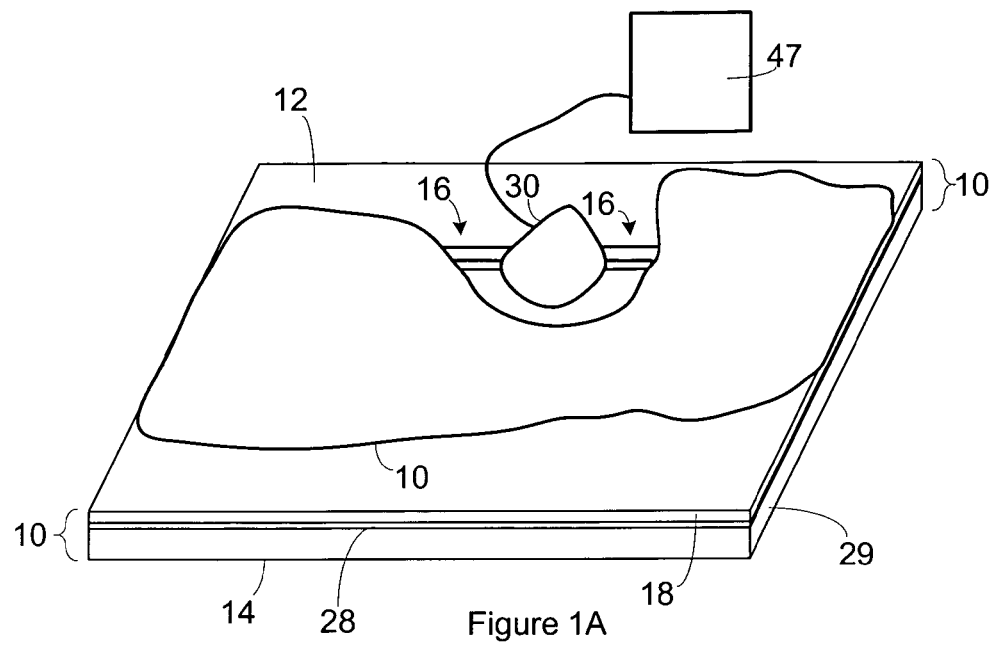
Figure 1B:
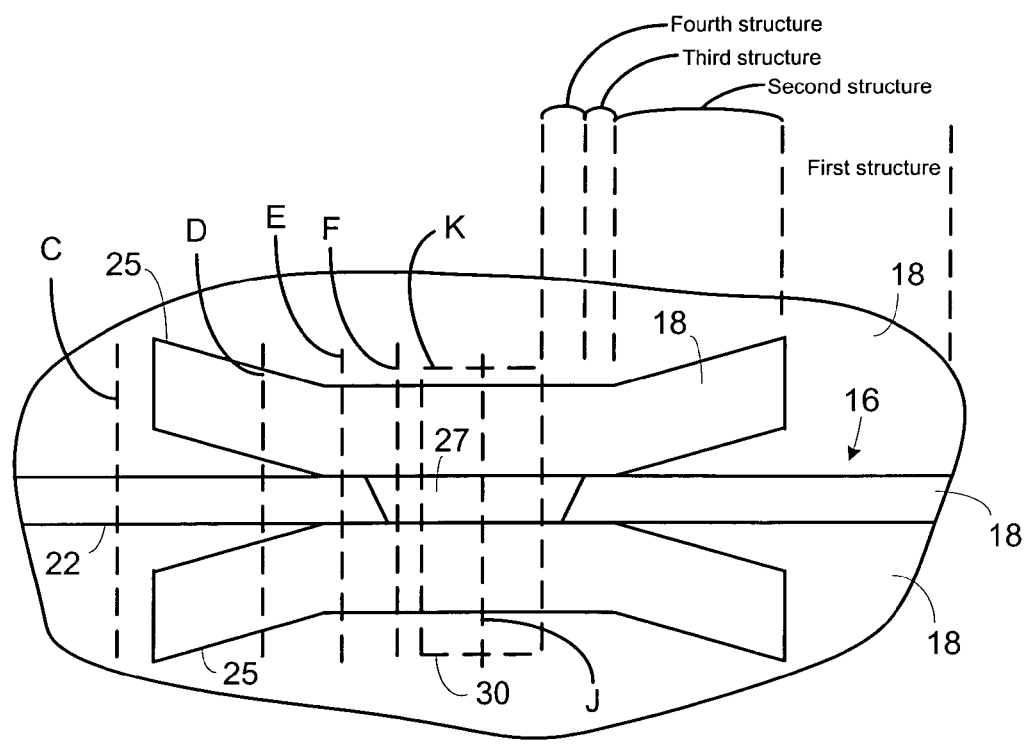
Figure 1J:
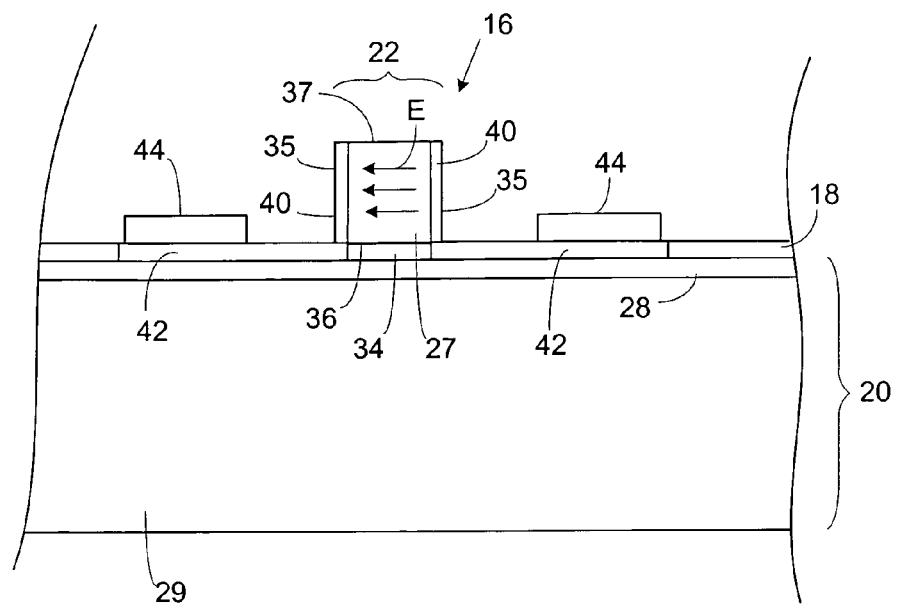

FIG. 1A through FIG. 1J illustrate an optical device having a waveguide that includes a modulator. FIG. 1A is a perspective view of the device. FIG. 1B is a topview of the portion of the optical device shown in FIG. 1A that includes an optical modulator. FIG. 1C is a cross-section of the device shown in FIG. 1A taken along the line labeled C. FIG. 1D is a cross-section of the optical device shown in FIG. 1A taken along the line labeled D. FIG. 1E is a cross-section of the optical device shown in FIG. 1A taken along the line labeled E. FIG. 1F is a cross-section of the optical device shown in FIG. 1A taken along the line labeled F. FIG. 1G is a cross-section of the optical device shown in FIG. 1A taken along the line labeled F. FIG. 1H is a cross-section of the optical device shown in FIG. 1A taken along the line labeled F. The embodiments shown in FIG. 1F, FIG. 1G, and FIG. 1H are alternative embodiments. FIG. 1J is a cross-section of the optical device shown in FIG. 1A taken along the line labeled J.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

A portion of the waveguide includes a first structure where a portion of the waveguide 16 is defined in a light-transmitting medium 18 positioned on a base 20. For instance, a portion of the waveguide 16 is partially defined by a ridge 22 extending upward from a slab region of the light-transmitting medium as shown in FIG. 1C. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and LiNbO$_3$. One or more cladding layers (not shown) are optionally positioned on the light-transmitting medium. The one or more cladding layers can serve as a cladding for the waveguide 16 and/or for the device. When the light-transmitting medium 18 is silicon, suitable cladding layers include, but are not limited to, silicon, polymers, silica, SiN, GaAs, InP and LiNbO$_3$.

Recesses 25 (FIG. 1B) extend into the slab regions such that the ridge 22 is positioned between recesses 25. The recesses 25 can extend only part way into the light-transmitting medium 18. As is evident from FIG. 1D, the recesses 25 can be spaced apart from the ridge 22. As a result, a portion of the waveguide 16 includes a second structure where an upper portion of the waveguide 16 is partially defined by the ridge 22 extending upward from the slab region and a lower portion of the waveguide is partially defined by recesses 25 extending into the slab regions and spaced apart from the ridge.

As shown in FIG. 1E, the recesses 25 can approach the ridge 22 such that the sides of the ridge 22 and the sides of the recesses 25 combine into a single surface 26. As a result, a portion of a waveguide includes a third structure where the waveguide is partially defined by the surface 26.

As is evident in FIG. 1B, a portion of the waveguide includes an electro-absorption medium 27. The electro-absorption medium 27 is configured to receive the light signals from a portion of the waveguide having the third structure and to guide the received light signals to another portion of the waveguide having the third structure.

The electro-absorption medium 27 extends upward from the bottom of the recesses 25. The electro-absorption medium 27 is configured to guide the light signals. For instance, as is evident in FIG. 1F, a portion of a waveguide includes a fourth structure where the waveguide is partially defined by the top and lateral sides of the electro-absorption medium 27.

In FIG. 1F, the electro-absorption medium 27 is positioned on a seed portion 34 of the light-transmitting medium 18. The seed portion 34 of the light-transmitting medium 18 is positioned on the base 20. In particular, the seed portion 34 of the light-transmitting medium 18 contacts the insulator 28. In some instances, when the light signal travels from the light-transmitting medium into the electro-absorption medium 27, a portion of the light signal enters the seed portion 34 of the light-transmitting medium 18 and another portion of the light signal enters the electro-absorption medium 27. During the fabrication of the device, the seed portion 34 of the light-transmitting medium 18 can be used to grow the electro-absorption medium 27. For instance, when the light-transmitting medium 18 is silicon and the electro-absorption medium 27 is germanium or germanium-silicon, the electro-absorption medium 27 can be grown on the silicon. As a result, the use of the light-transmitting medium 18 in both the waveguides 16 and as a seed layer for growth of the electro-absorption medium 27 can simplify the process for fabricating the device.

FIG. 1G is an alternative to the fourth structure illustrated in FIG. 1F. In FIG. 1G, the electro-absorption medium 27 is positioned on a seed portion 34 of the light-transmitting medium 18 without the seed portion 34 of the light-transmitting medium 18 extending substantially beyond the lateral sides of the electro-absorption medium 27. Additionally, the slab regions of the light-transmitting medium 18 are not present adjacent to the ridge of the electro-absorption medium 27. Accordingly, a portion of a waveguide includes a fourth structure where the waveguide is partially defined by the top and lateral sides of the electro-absorption medium 27. In some instances, when the light signal travels from the light-transmitting medium into the electro-absorption medium 27, a portion of the light signal enters the seed portion 34 of the light-transmitting medium 18 and another portion of the light signal enters the electro-absorption medium 27. As described above, the electro-absorption medium 27 can be grown on the seed portion of the light-transmitting medium 18.

FIG. 1H is an alternative to the fourth structure illustrated in FIG. 1F and FIG. 1G. In FIG. 1H, a ridge 22 of electro-absorption medium 27 extends upward from a slab region of the electro-absorption medium 27. Accordingly, a portion of a waveguide includes a fourth structure where the waveguide is partially defined by the top and lateral sides of the electro-absorption medium 27. The slab regions of the electro-absorption medium 27 and the ridge 22 of the electro-absorption medium 27 are both positioned on a seed portion 34 of the light-transmitting medium 18. As a result, the seed portion 34 of the light-transmitting medium 18 is between the electro-absorption medium 27 and the base 20. In some instances, when the light signal travels from the light-transmitting medium into the electro-absorption medium 27, a portion of the light signal enters the seed portion 34 of the light-transmitting medium 18 and another portion of the light signal enters the electro-absorption medium 27. As described above, the electro-absorption medium 27 can be grown on the seed portion of the light-transmitting medium 18.

As is evident in FIG. 1B, there is an interface between each facet of the electro-absorption medium 27 and a facet of the light-transmitting medium 18. The interface can have an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 28 with a lower index of refraction than the light-transmitting medium 18. The drop in the index of refraction can cause reflection of a light signal from the light-transmitting medium 18 back into the light-transmitting medium 18. The base 20 can include the optical insulator 28 positioned on a substrate 29. As will become evident below, the substrate 29 can be configured to transmit light signals. For instance, the substrate 29 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 28 and the silicon substrate can serve as the substrate 29.

The optical device includes a modulator 30. The location of the modulator on the optical device is illustrated by the line labeled J in FIG. 1B. In order to simplify FIG. 1B, the details of the modulator construction are not shown in FIG. 1B. However, the modulator construction is evident from other illustrations such as FIG. 1J. The modulator of FIG. 1J can be constructed on the portion of the waveguide having a fourth structure constructed according to FIG. 1F. The modulator is configured to apply an electric field to the electro-absorption medium 27 that is substantially parallel to the base 20 in order to phase and/or intensity modulate the light signals received by the modulator.

The electro-absorption medium 27 can include lateral sides 35 that connect a bottom side 36 and a top side 37. The bottom side is located between the top side and the base 20. In some instances, the lateral sides are substantially perpendicular relative to the base 20.

The lateral sides of the electro-absorption medium 27 can include doped regions 40. As is evident from FIG. 1J, each of the doped regions 40 can extend up to the top side of the electro-absorption medium 27. Each of the doped regions 40 can be an N-type doped regions or a P-type doped region. For instance, each of the N-type doped regions can include an N-type dopant and each of the P-type doped regions can include a P-type dopant. In some instances, the electro-absorption medium 27 includes a doped region 40 that is an N-type doped region and a doped region 40 that is a P-type doped region. The separation between the doped regions 40 in the electro-absorption medium 27 results in the formation of PIN (p-type region-insulator-n-type region) junction in the modulator 30.

In the electro-absorption medium 27, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$. A suitable concentration for the N-type dopant in an N-type doped region includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$.

The light-transmitting medium 18 also includes doped regions 42. Each doped region 42 in the light-transmitting medium 18 contacts one of the doped regions 40 in the electro-absorption medium 27. A doped region 42 in the light-transmitting medium 18 and the contacted doped region 40 are the same type of doped region. For instance, when a doped region 40 in the electro-absorption medium 27 is a P-type region, that doped region 40 contacts a P-type doped region in the light-transmitting medium 18. As a result, in some instances, one of the doped regions 42 in the light-transmitting medium 18 is a P-type doped region and one of the doped regions 42 in the light-transmitting medium 18 is an N-type doped region.

In the light-transmitting medium 18, suitable dopants for N-type regions include, but are not limited to, phosphorus and/or arsenic. Suitable dopants for P-type regions include, but are not limited to, boron. The doped regions 42 are doped so as to be electrically conducting. A suitable concentration for the P-type dopant in a P-type doped region includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$. A suitable concentration for the N-type dopant in an N-type doped region includes, but is not limited to, concentrations greater than $1 \times 10^{15}$ cm$^{-3}$, $1 \times 10^{17}$ cm$^{-3}$, or $1 \times 10^{19}$ cm$^{-3}$, and/or less than $1 \times 10^{17}$ cm$^{-3}$, $1 \times 10^{19}$ cm$^{-3}$, or $1 \times 10^{21}$ cm$^{-3}$.

Each doped region 42 in the light-transmitting medium 18 is in contact with an electrical conductor 44 such as a metal. Accordingly, the each of the doped regions 42 in the light-transmitting medium 18 provides electrical communication between an electrical conductor 44 and one of the doped regions 40 in the electro-absorption medium 27. As a result, electrical energy can be applied to the electrical conductors 44 in order to apply the electric field to the electro-absorption medium 27. As is evident from the arrows labeled E in FIG. 1J, the doped regions 40 in the electro-absorption medium 27 serve as the field sources for the electrical field. As a result, the resulting electrical field is substantially parallel to the base 20.

Figure 2A:
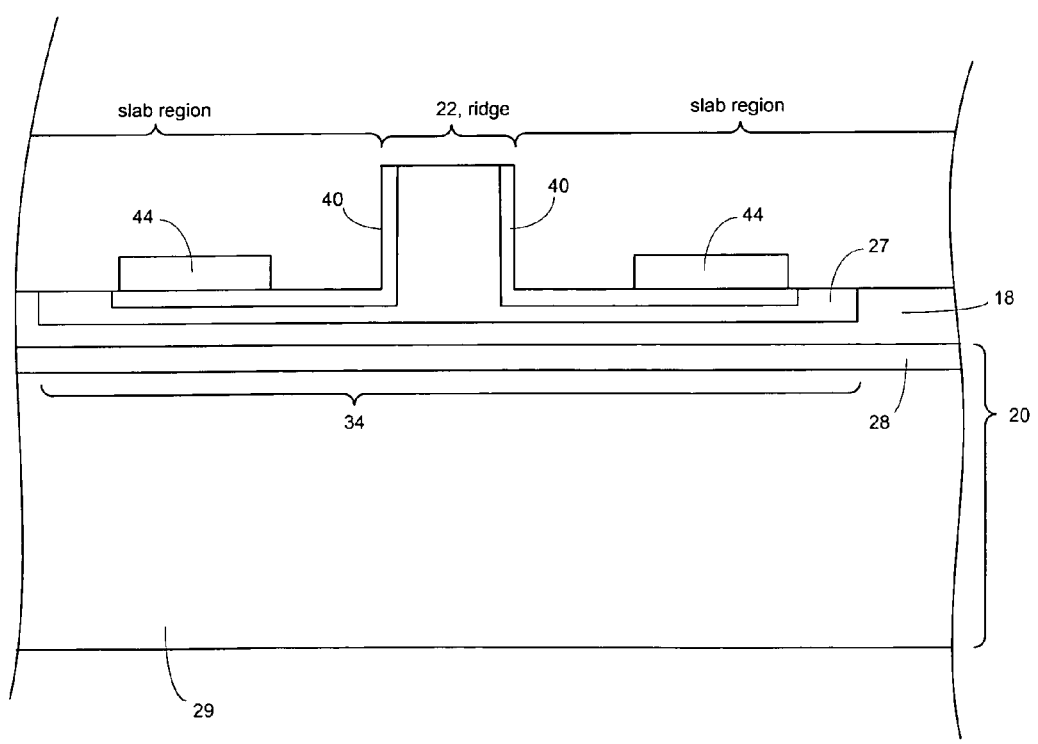
FIG. 2A is a cross section of an embodiment of a modulator that can be constructed on a waveguide having a structure constructed according to FIG. 1H.

FIG. 2A presents another construction of the modulator that can simplify the fabrication process. The modulator of FIG. 2A can be constructed on the portion of the waveguide having a fourth structure constructed according to FIG. 1H.

A ridge 22 of electro-absorption medium 27 extends upward from a slab region of the electro-absorption medium 27. The doped regions 40 are both in the slab regions of the electro-absorption medium 27 and also in the ridge of the electro-absorption medium 27. For instance, doped regions 40 of the electro-absorption medium 27 are positioned on the lateral sides of the ridge 22 of the electro-absorption medium 27. Additionally, the doped regions 40 extend from the ridge 22 into the slab region of the electro-absorption medium 27. The transition of a doped region 40 from the ridge 22 of the electro-absorption medium 27 into the slab region of the electro-absorption medium 27 can be continuous and unbroken as shown in FIG. 2A.

Electrical conductors 44 are positioned on the slab region of the electro-absorption medium 27. In particular, the electrical conductors 44 each contact a portion of a doped region 40 that is in the slab region of the electro-absorption medium 27.

The arrangement of FIG. 2A may have a simplified fabrication process relative to an arrangement such as illustrated in FIG. 1J. For instance, in FIG. 1J, doped regions 40 are formed in the light-transmitting medium 18 and also in the electro-absorption medium 27. Different conditions may be required to form these regions in the different materials. For instance, when the light-transmitting medium 18 is silicon and the electro-absorption medium 27 is germanium, it may be desirable to use different temperatures to form the doped regions 40 in the electro-absorption medium 27 than is used to form the doped regions 42 in the light-transmitting medium 18. However, since the arrangement of FIG. 2A requires that the doped regions be formed only in the electro-absorption medium, the arrangement of FIG. 2A may be simpler to fabricate.

Although FIG. 2A illustrates each of the doped regions extending only part way into slab regions of the electro-absorption medium, one or more of the doped regions can extend through the slab regions of the electro-absorption medium. Accordingly, one or more of the doped regions can contact the light-transmitting medium 18. Further, one or more of the doped regions can extend through the slab regions of the electro-absorption medium and into the light-transmitting medium 18.

Figure 2B:
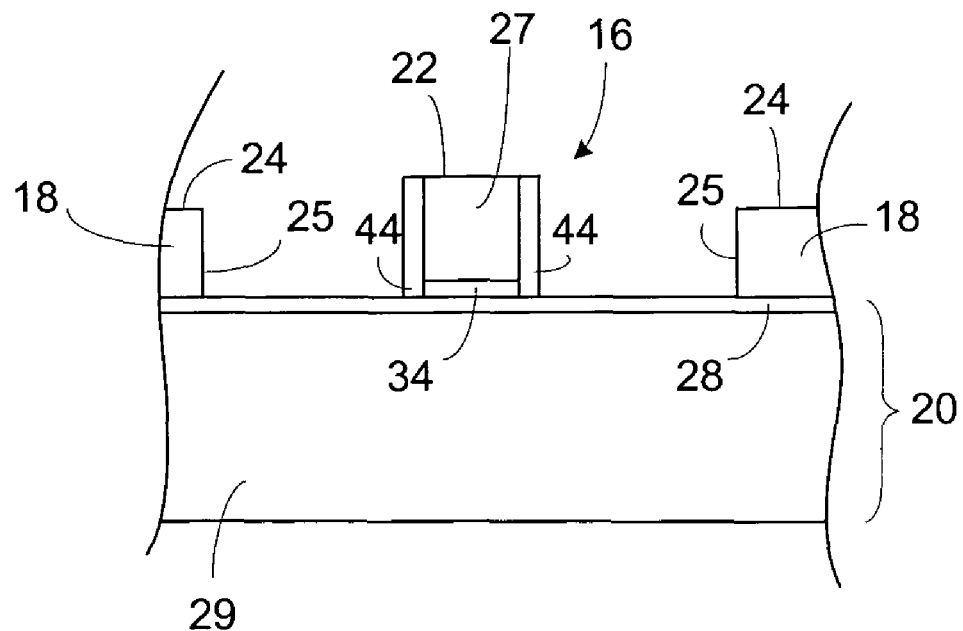
FIG. 2B is a cross section of an embodiment of a modulator that can be constructed on a waveguide having a structure constructed according to FIG. 1G.

Rather than using doped regions 40 in the electro-absorption medium 27 as the field sources, electrical conductors 44 such as metal can be used as the field sources. For instance, FIG. 2B is a cross-section of a modulator that employs electrical conductors 44 as field sources. The modulator of FIG. 2B can be constructed on the portion of the waveguide having a fourth structure constructed according to FIG. 1G. The electrical conductors 44 extend from the base 20 to the top side of the electro-absorption medium 27. For instance, FIG. 2B illustrates the electrical conductors 44 extending from the insulator 28 to the top side of the electro-absorption medium 27. The seed portion 34 of the light-transmitting medium 18 is between the base 20 and the electro-absorption medium 27.

Figure 2C:
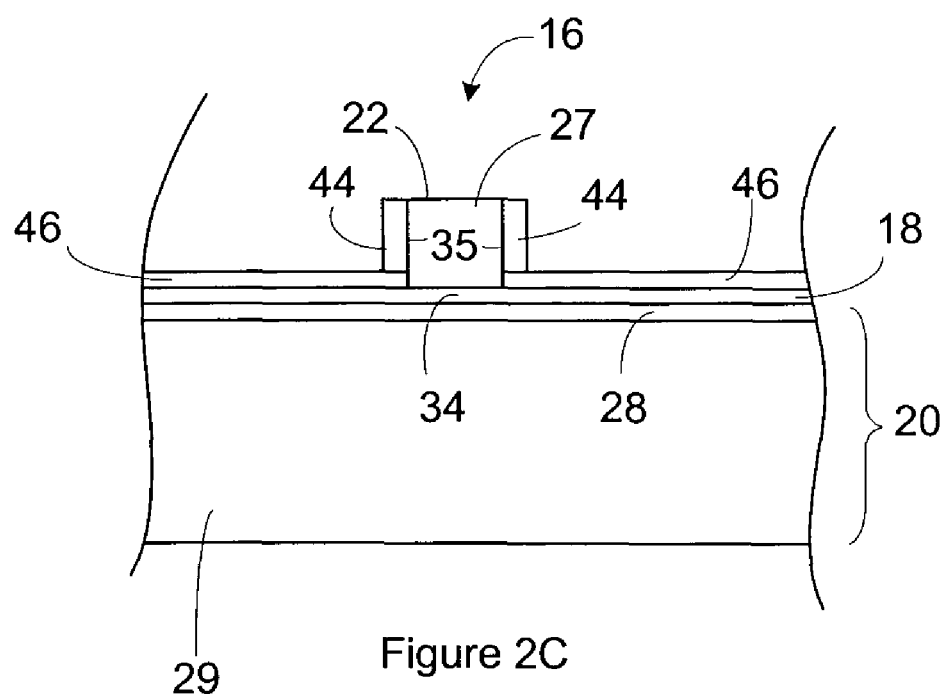
FIG. 2C is a cross section of an embodiment of a modulator that can be constructed on a waveguide having a structure constructed according to FIG. 1F.

As is evident from FIG. 2B, the electrical conductors 44 can contact the base 20. However, the electrical conductors 44 can be spaced apart from the base 20 as illustrated in FIG. 2C. The modulator or FIG. 2C can be constructed on the portion of the waveguide having a fourth structure constructed according to FIG. 1F. In FIG. 2C, a spacer layer 46 is formed on top of the light-transmitting medium 18 and against the lateral sides of the electro-absorption medium 27. The electrical conductors 44 extend from the top of the spacer layer 46 to the top side of the electro-absorption medium 27. As a result, the spacer layer 46 elevates the bottom of the electrical conductors 44 relative to the base 20. The electrical conductors 44 are also elevated above the interface between the electro-absorption medium 27 and the seed portion 34 of the light-transmitting medium 18. The elevation of the electrical conductors 44 reduces interaction between the resulting electrical field and the interface between the electro-absorption medium 27 and the seed portion 34 of the light-transmitting medium 18.

During operation of the modulators of FIG. 1A through FIG. 2C, electronics 47 (FIG. 1A) can be employed to apply electrical energy to the field sources so as to form an electrical field in the electro-absorption medium. For instance, the electronics can form a voltage differential between the field sources. The electrical field can be formed without generating a significant electrical current through the electro-absorption medium 27. The electro-absorption medium can be a medium in which the Franz-Keldysh effect occurs in response to the application of the electrical field. The Franz-Keldysh effect is a change in optical absorption and optical phase by an electro-absorption medium 27. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the electro-absorption medium 27 can absorb light signals received by the electro-absorption medium 27 and increasing the electrical field increases the amount of light absorbed by the electro-absorption medium 27. Accordingly, the electronics can tune the electrical field so as to tune the amount of light absorbed by the electro-absorption medium 27. As a result, the electronics can intensity modulate the electrical field in order to modulate the light signal. Additionally, the electrical field needed to take advantage of the Franz-Keldysh effect generally does not involve generation of free carriers by the electric field.

Suitable electro-absorption media 27 include semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

Strain can optionally be placed on the electro-absorption media 27 in other to shift the range of wavelengths at which modulation is most efficient. For instance, increased tensile strain can shift the range of suitable modulation wavelengths to longer wavelengths. A number of techniques can be employed to place strain on the electro-absorption medium 27. For instance, thermally induced strain can be created during the growth of the electro-absorption medium 27 on the seed portion 34 of the light-transmitting medium 18. In this case the strain results from the different lattice structures between the electro-absorption medium 27 and the seed portion 34. Additionally or alternately, a layer of strain-inducing material can be grown or deposited on the top of the electro-absorption medium 27. The strain-inducing medium can be selected such that the difference in the lattice structures of the electro-absorption medium 27 and the strain-inducing medium provide the strain on the strain-inducing medium. When the electro-absorption medium 27 is germanium or germanium-silicon, suitable strain-inducing media include, but are not limited to, dielectrics such as $SiO_2$, and SiN, and metals such as aluminum. The strain-inducing medium can contact the electro-absorption medium 27 but need not. For instance, the strain-inducing medium can be positioned on the bottom of the substrate 29. In this instance, the strain-inducing medium can be selected such that the difference in the lattice structures of the strain-inducing medium and the substrate 29 can cause the device to bend and accordingly strain the electro-absorption medium 27. When the substrate 29 is silicon, suitable strain-inducing media include, but are not limited to, dielectrics such as $SiO_2$, and SiN, and metals such as aluminum.

The composition and level of strain placed on the electro-absorption medium 27 can be selected such that the electro-absorption medium 27 is a direct band gap material rather than an indirect band gap material.

The modulator can also be used as a phase modulator. For instance, the electronics (not shown) can be employed to apply electrical energy to the field sources so as to form a phase modulation electrical field in the electro-absorption medium. The phase modulation electrical field can change the index of refraction of the electro-absorption medium 27. As a result, tuning of the phase modulation electrical field can tune the speed at which the light signal travels through the modulator. A phase modulation electrical field can be different from the intensity modulation electrical field described above in that a phase modulation electrical field is generally weaker than the electrical field used for intensity modulation. Further, there may be some degree of phase modulation associated with the intensity modulation described above.

Increasing the portion of the lateral side of the ridge electro-absorption medium 27 that is contacted by the field source can increase the efficiency of the modulator. Accordingly, as is evident in FIG. 1A, FIG. 2B, and FIG. 2A, each of the field sources can span the distance between the top of the lateral side contacted by the field source and the bottom of the lateral side contacted by the field source. In some instances, each of the field sources extends from the top of the lateral side contacted by the field source toward the base 20. Alternately, each of the field sources can extend toward the base 20 from a location that is above 90% of a distance between the top of the lateral side contacted by the field source and the bottom of the lateral side contacted by the field source. Each of the field sources can extend toward the base 20 from a location that is above 80% of a distance between the top of the lateral side contacted by the field source and the bottom of the lateral side contacted by the field source. In one example, each of the field sources extends toward the base 20 from a location that is within 1.0 μm of a top of the lateral side contacted by that field source.

The width of the portion of the waveguide having the fourth structure can affect the performance of the modulator. The width of the waveguide or a portion of the waveguide refers to the width of that defines the waveguide in that portion of the waveguide. For instance, the width of the top of the ridge of electro-absorption medium 27 in the modulator can affect the modulation speed. A narrower width can provide faster modulation speeds. A suitable width for the top of the ridge of electro-absorption medium 27 in the modulator includes, but is not limited to, widths greater than 0.2 μm, 0.5 μm, and 0.75 μm, and/or less than 1.25 μm, 1.5 μm, and 2 μm. An example of a preferred width for the top of the ridge of electro-absorption medium 27 in the modulator is 1 μm.

Figure 3:
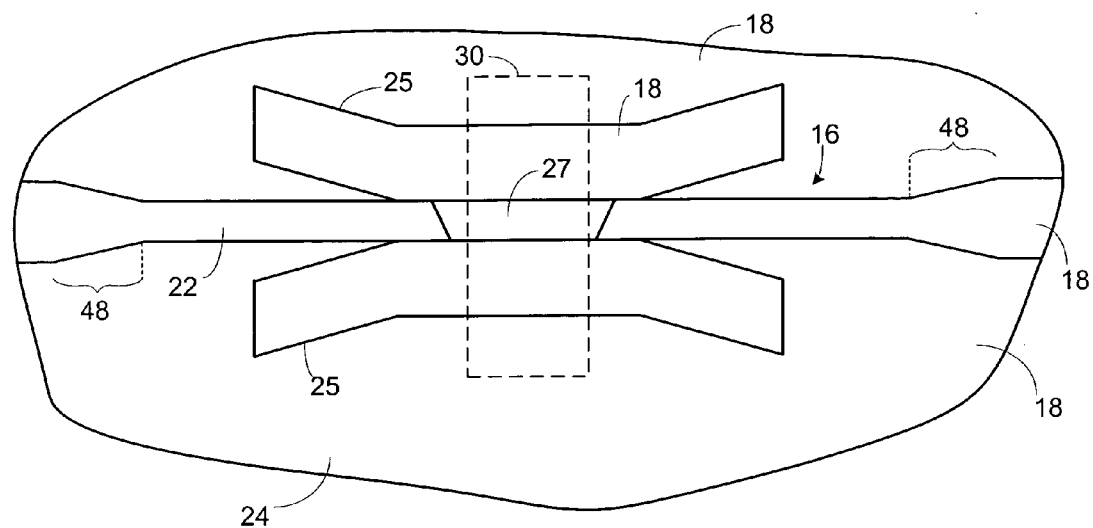
FIG. 3 is a topview of the optical device of FIG. 1B where the waveguide includes horizontal tapers and excludes vertical tapers.

The width of the waveguide can include horizontal tapers configured such that the electro-absorption medium 27 has the desired width in the modulator. For instance, FIG. 3 is a topview of an optical device where the waveguide 16 includes tapers 48. The tapers 48 can be a horizontal taper and need not include a vertical taper although a vertical taper is optional. One of the tapers 48 is positioned before the modulator and can taper the waveguide to the width that is desired for the electro-absorption medium 27 in the modulator. Another taper 48 is positioned after the modulator and can return the waveguide to the desired dimensions.

The horizontal tapers occur in the light-transmitting medium 18 rather than in the electro-absorption medium 27. The horizontal tapers can each be between a portion of the waveguide having the first structure and an expanded portion of the waveguide. The optical device preferably excludes additional components between the tapers and modulator although other components may be present.

The expanded portion of the waveguide can be either multi-mode or single mode. Additionally, the portions of the waveguide having the first structure can be single mode or multi-mode. The portions of the waveguide having the third structure can be multi-mode or single mode. However, even when the portions of the waveguide having the first structure are single mode, the portions of the waveguide having the third structure can become vertically multimode as a result of the ridge having an increased height relative to the height of the ridge in the portions of the waveguide having the first structure. In general, the portion of the waveguide having the fourth structure is single mode when the portions of the waveguide having the third structure are single mode and the portion of the waveguide having the fourth structure is multi-mode when the portions of the waveguide having the third structure are multi-mode.

In view of the above, the portions of the waveguide having the second structure can be a transition between a portion of the waveguide that is single mode and a portion of the waveguide that is at least vertically multi-mode. In these instances, the distance between the recess and the ridge can taper so as to reduce excitation of higher order modes during this transition. In instances, where the portions of the waveguide having the second structure do not provide a transition between a portion of the waveguide that is single mode and a portion of the waveguide that multi-mode, the distance between the recess and the ridge can also taper so as to reduce excitation of higher order modes.

Since the electrical field that forms as a result of using the above structures is substantially parallel to the base, changing the height of the electro-absorption medium 27 in the modulator does not substantially increase the modulation speed. As a result, there is no need for a vertical taper between large dimension waveguides and the modulator. Accordingly, the portions of the waveguide having the second structures, the third structures and the fourth structure can each exclude a vertical taper.

As noted above, the modulator is suitable for use with waveguide dimensions that are suitable for use in communications applications. Accordingly, a suitable height (distance between top of ridge 22 and the base) for the potion of the waveguide 16 having the first structure (FIG. 1C) includes, but is not limited to, heights greater than 1 μm, 2 μm, and 3 μm. A suitable width of the ridge for the portion of the waveguide 16 having the first structure (FIG. 1C) includes, but is not limited to, widths greater than 0.25 μm, 0.5 μm, and 0.75 μm.

Since the portions of the waveguide having the second structures, the third structures and the fourth structure can each exclude a vertical taper, the height (distance between top of ridge 22 and the base) of each of these portions of the waveguide can be about the same. In some instance, the height (distance between top of ridge 22 and the base) of the portions of the waveguide having the first structure is the same as the height of the second structures, the third structures and the fourth structure.

A suitable depth for the recesses to extend into the slab region of the light-transmitting medium includes but is not limited to, depths greater than 1.5 μm, 2.5 μm, and 3 μm and/or less than 3.5 μM, 4 μm, and 4.5 μm. A suitable height for the ridge (distance between the top of the ridge and the top of the slab portions of the light-transmitting medium) in the portions of the waveguide having the first structure include, but are not limited to, heights greater than 2 μm, 3 μm, and 3.5 μm, and/or less than 4 μm, 4.5 μm, and 5 μm.

Figure 4:
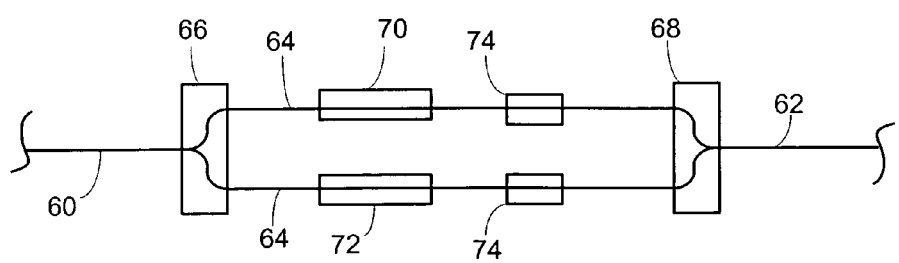
FIG. 4 illustrates an optical device having the modulator incorporated into a Mach-Zehnder interferometer.

The above modulator can be incorporated into a Mach-Zehnder interferometer as schematically illustrated in FIG. 4. The Mach-Zehnder interferometer includes an input waveguide 60, an output waveguide 62, and branch waveguide 64. A first splitter 66 and/or combiner divides a light signal guided on the input waveguide into branch signal that are each on one of the branch waveguides. A second splitter and/or combiner 68 combines the branch signals into an output signal on the output waveguide.

A first modulator 70 is configured to modulate the branch signal on one of the branch waveguides and a second modulator 72 is configured to modulate the branch signal on the other branch waveguide. The first modulator and the second modulator can be configured as disclosed above and can each be operated as a phase modulator. By controlling the phase differential between the light signals on the branch waveguides, the intensity of the output light signal can be modulated. As a result, operating the modulators as a phase modulator can result in intensity modulation of the light signals.

One or more of the branch waveguides can optionally include other components such as variable optical attenuators 74 for balancing out the intensity on the different branch waveguides. Although modulators are shown positioned on each of the branch waveguides, only one of the branch waveguides need include a modulator in order for intensity modulation to be achieved.

The optical device can be constructed using fabrication technologies that are employed in the fabrication of integrated circuits, optoelectronic circuits, and/or optical devices. FIG. 5A through FIG. 14 illustrate a method of forming an optical device having a modulator constructed according to FIG. 1A through FIG. 1F, and FIG. 1J. The method is illustrated using a silicon-on-insulator wafer or chip as the starting precursor for the optical device. However, the method can be adapted to platforms other than the silicon-on-insulator platform.

Figure 5A:
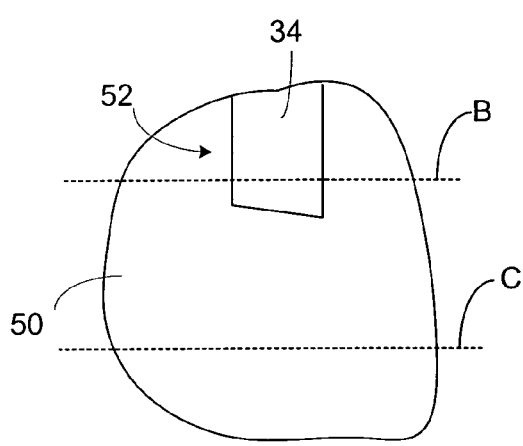
FIG. 5A through FIG. 14 illustrate a method of forming an optical device having a modulator constructed according to FIG. 1A through FIG. 1F, and FIG. 1J.
Figure 5B:
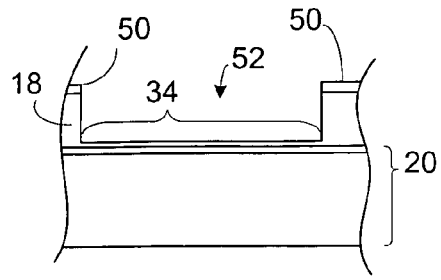
Figure 5C:
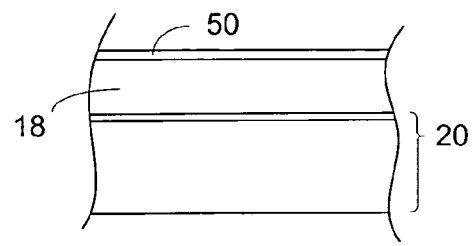

FIG. 5A through FIG. 5C illustrate a first mask 50 formed on the silicon-on-insulator wafer or chip to provide a device precursor. FIG. 5A is a topview of the device precursor. FIG. 5B is a cross-section of the device precursor shown in FIG. 5A taken along the line labeled B. FIG. 5C is a cross-section of the device precursor shown in FIG. 5A taken along the line labeled C. The first mask 50 leaves exposed a region of the device precursor where an electro-absorption cavity 52 is to be formed while the remainder of the illustrated portion of the device precursor is protected. The electro-absorption cavity 52 is the region of the device precursor where the electro-absorption medium will to be formed. A first etch is then performed so as to form the electro-absorption cavity 52. The first etch yields the device precursor of FIG. 5A through FIG. 5C. The first etch is performed such that the seed portion 34 of the light-transmitting medium 18 remains on the base 20. Accordingly, the first etch is terminated before the base 20 is reached.

A suitable first mask 50 includes, but is not limited to, a hard mask such as a silica mask. A suitable first etch includes, but is not limited to, a dry etch.

Figure 6A:
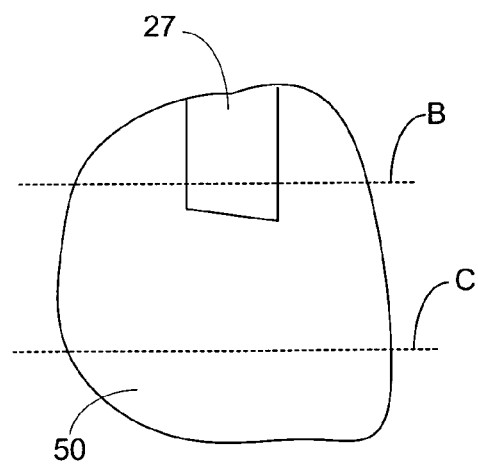
Figure 6B:
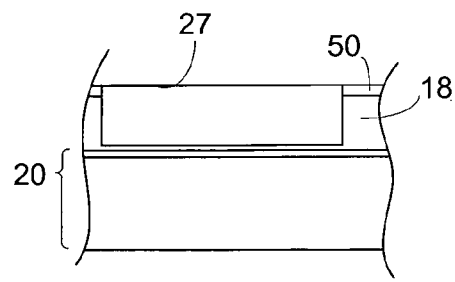
Figure 6C:
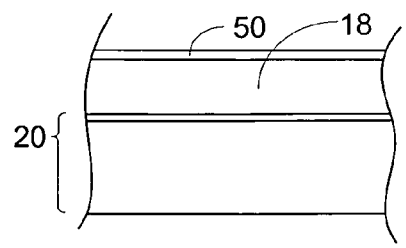

As shown in FIG. 6A through FIG. 6C, the electro-absorption medium 27 is formed in the sensor cavity 52 of FIG. 5A through FIG. 5C. FIG. 6A is a topview of the device precursor. FIG. 6B is a cross-section of the device precursor shown in FIG. 6A taken along the line labeled B. FIG. 6C is a cross-section of the device precursor shown in FIG. 6A taken along the line labeled C. When the light-transmitting medium 18 is silicon and the electro-absorption medium 27 is germanium or germanium-silicon, the electro-absorption medium 27 can be grown on the seed portion 34 of the silicon. After formation of the electro-absorption medium 27, the first mask 50 can be removed and the device precursor can be planarized. Suitable methods for polishing include, but are not limited to, a chemical-mechanical polishing (CMP) process.

Figure 7A:
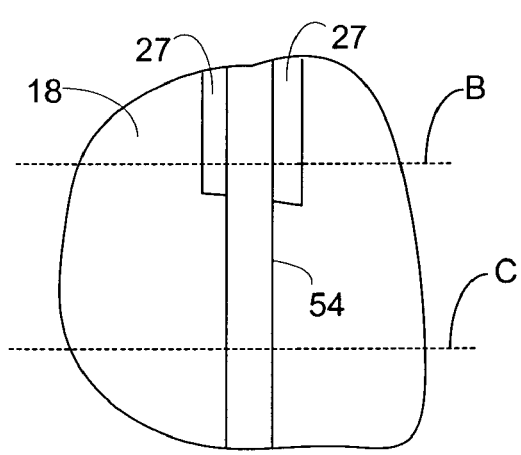
Figure 7B:
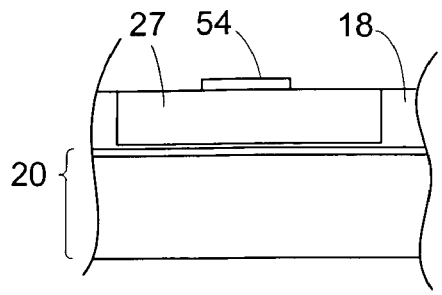
Figure 7C:
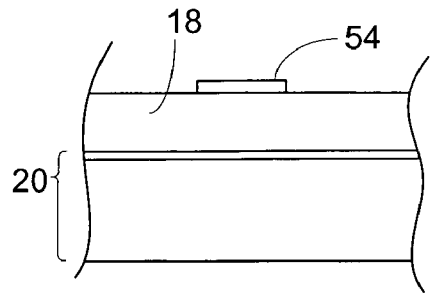

A second mask 54 can be formed on the device precursor so as to provide the device precursor of FIG. 7A through FIG. 7C. FIG. 7A is a topview of the device precursor. FIG. 7B is a cross-section of the device precursor shown in FIG. 7A taken along the line labeled B. FIG. 7C is a cross-section of the device precursor shown in FIG. 7A taken along the line labeled C. The second mask 54 is formed such that the regions where the ridge of the waveguide is to be formed is protected while the remainder of the illustrated portion of the device precursor remains exposed. A suitable second mask 54 includes a hard mask such as a silica mask.

Figure 8A:
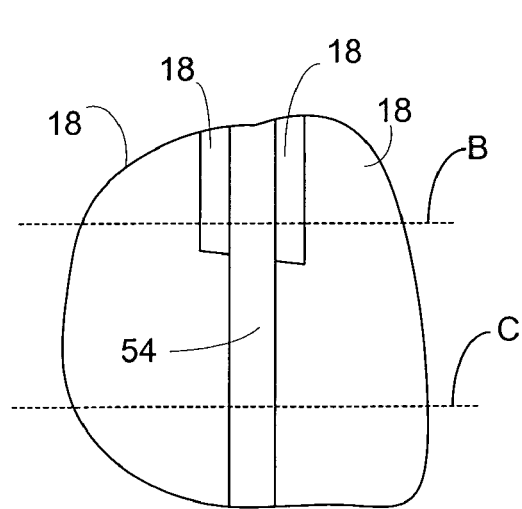
Figure 8B:
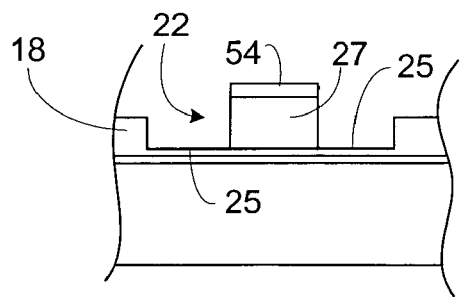
Figure 8C:
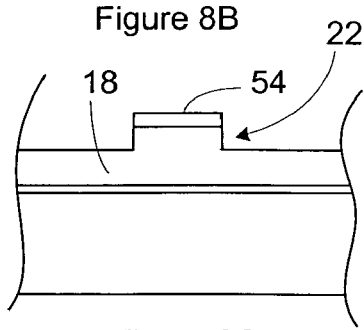

A second etch is performed on the device precursor of FIG. 7A through FIG. 7C to provide the device precursor of FIG. 8A through FIG. 8C. FIG. 8A is a topview of the device precursor. FIG. 8B is a cross-section of the device precursor shown in FIG. 8A taken along the line labeled B. FIG. 8C is a cross-section of the device precursor shown in FIG. 8A taken along the line labeled C. Since the second etch etches the light-transmitting medium 18 and the electro-absorption medium 27 concurrently, the second etch etches the light-transmitting medium 18 and the electro-absorption medium 27 to different depths. For instance, FIG. 8B illustrates the electro-absorption medium 27 etched deeper than the light-transmitting medium 18. The second etch is performed through the electro-absorption medium 27 positioned on either side of the ridge 22 down to the underlying light-transmitting medium 18. A suitable second etch includes, but is not limited to, a dry etch that can etch both the light-transmitting medium 18 and the electro-absorption medium 27.

Figure 9A:
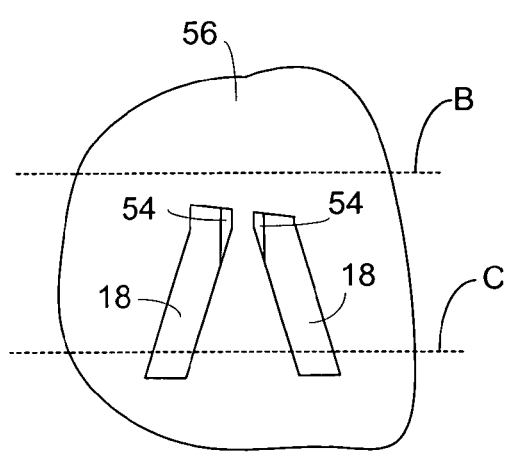
Figure 9B:
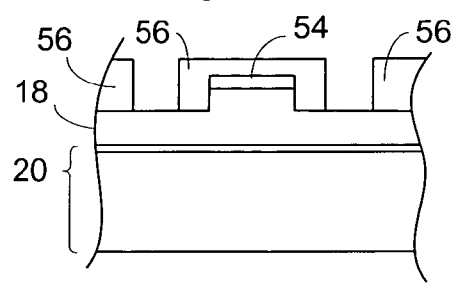
Figure 9C:
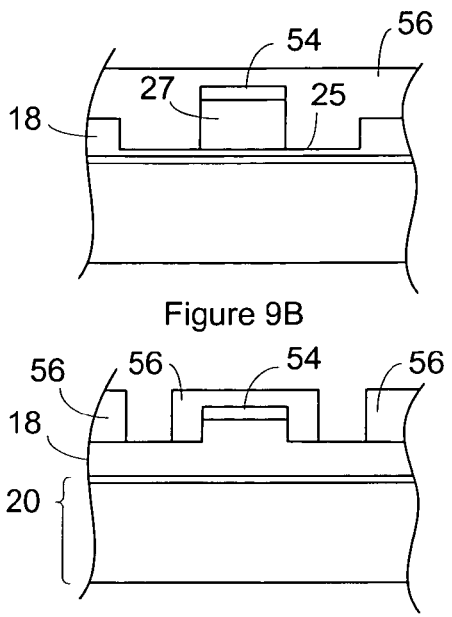

A third mask 56 is formed on the device precursor of FIG. 8A through FIG. 8C as shown by the device precursor of FIG. 9A through FIG. 9C. FIG. 9A is a topview of the device precursor. FIG. 9B is a cross-section of the device precursor shown in FIG. 9A taken along the line labeled B. FIG. 9C is a cross-section of the device precursor shown in FIG. 9A taken along the line labeled C. Portions of the third mask 56 are formed over the second mask 54. The third mask 56 is formed such that the locations on the device precursor where taper portions of the recesses are to be formed remain exposed while the remaining regions of the illustrated portion of the device precursor are protected. The taper portions of the recesses are the portions of the recesses that are spaced apart from the ridge 22.

Figure 10A:
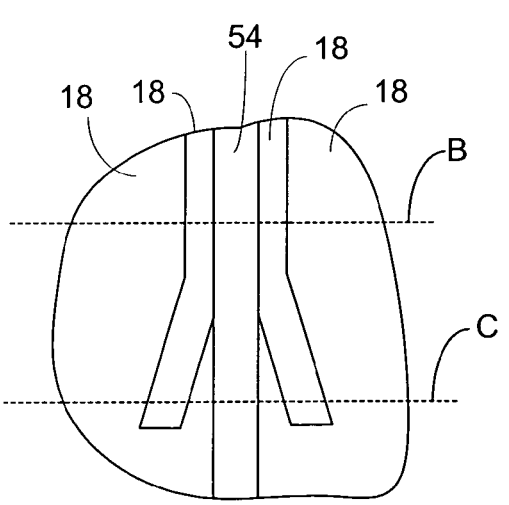
Figure 10B:
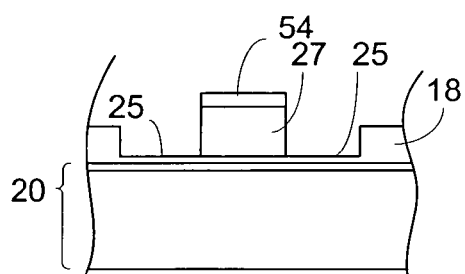
Figure 10C:
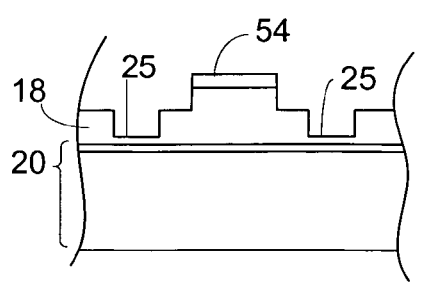

A third etch is then performed so as to provide the device precursor of FIG. 10A through FIG. 10C. FIG. 10A is a topview of the device precursor. FIG. 10B is a cross-section of the device precursor shown in FIG. 10A taken along the line labeled B. FIG. 10C is a cross-section of the device precursor shown in FIG. 10A taken along the line labeled C. The third etch is performed to about the depth to which the electro-absorption medium 27 was etched during the second etch. As a result, the third etch forms the taper portions of the recesses 25.

A suitable third mask 56 includes, but is not limited to, a photoresist. A suitable third etch includes, but is not limited to, a dry etch.

Figure 11A:
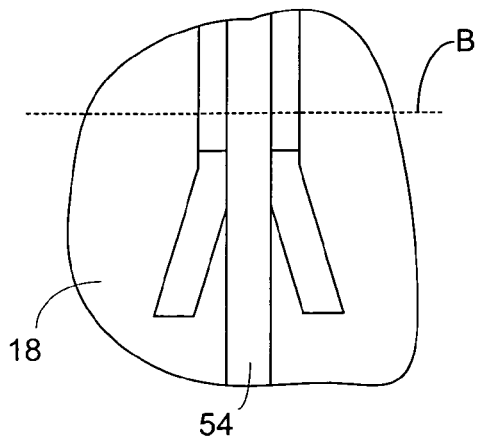
Figure 11B:
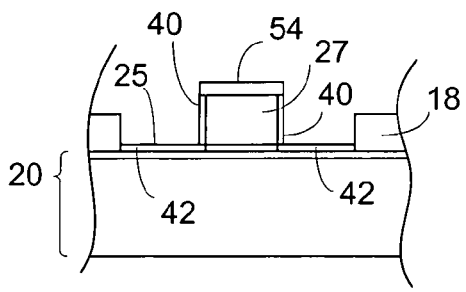

The third mask 56 is removed and doped regions 40, 42 are formed in the light-transmitting medium 18 and in the electro-absorption medium 27 so as to provide the device precursor of FIG. 11A and FIG. 11B. FIG. 11A is a topview of the device precursor. FIG. 11B is a cross-section of the device precursor shown in FIG. 11A taken along the line labeled B. The n-type doped regions can be generated by forming a doping mask on the device precursor so the locations of the n-type doped regions are exposed and the remainder of the illustrated portion of the device precursor is protected. High angle dopant implant processes can be employed to form the n-type doped regions. The doping mask can then be removed. The same sequence can then be employed to form the p-type doped regions. The p-type doped regions can be formed before the n-type doped regions or the n-type doped regions can be formed before the p-type doped regions.

Figure 12:
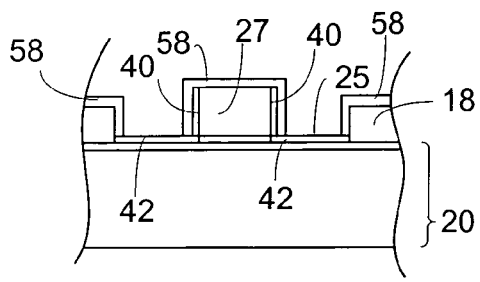

The second mask 54 is removed from the device precursor of FIG. 11A and FIG. 12B and a first cladding 58 is formed on the device precursor so as to provide the device precursor of FIG. 12. FIG. 12 is a cross section of the device precursor through the region where the modulator is being formed such as the cross section of FIG. 11B. The first cladding 58 is formed such that the portion of the doped regions 42 that are to be contacted by the electrical conductors 44 remain exposed and the remainder of the illustrated portion of the device precursor are protected by the first cladding 58. A suitable first cladding 58 includes, but is not limited to, PECVD deposited silica that is subsequently patterned using photolithography.

Figure 13:
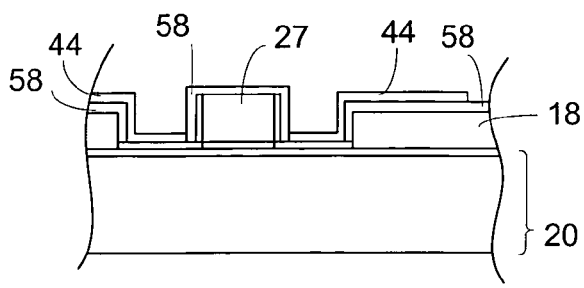

The electrical conductors 44 are formed on the device precursor of FIG. 12 so as to provide the device precursor of FIG. 13. FIG. 12 is a cross section of the device precursor through the region where the modulator is being formed such as the cross section of FIG. 11B. The electrical conductors 44 can be formed so each electrical conductor 44 extend from one of the doped regions 42, out of the recess 25, and over the light-transmitting medium 18. Suitable electrical conductors 44 include metals such as titanium and aluminum. The metals can be deposited by sputtering and patterned by photolithography.

Figure 14:
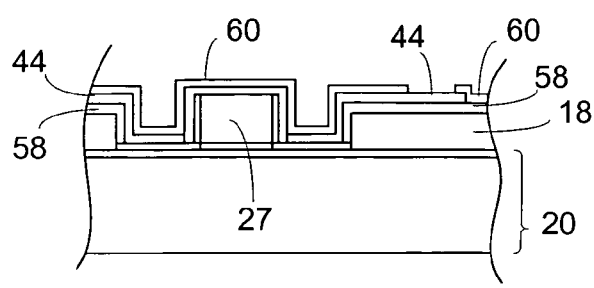

A second cladding 60 can optionally be formed on the device precursor of FIG. 13 so as to provide the device precursor of FIG. 14. FIG. 12 is a cross section of the device precursor through the region where the modulator is being formed such as the cross section of FIG. 11B. As is evident in FIG. 14, the second cladding 60 can be patterned such that the second cladding 60 defines contact pads the electrical conductors 44. A suitable second cladding 60 includes, but is not limited to, PECVD deposited SiN that is subsequently patterned using photolithography. After removing photoresists formed during photolithography, the device precursor of FIG. 14 can be sintered to form the optical device.

The device can be used in conjunction with electronics that are in electrical communication with the contact pads. The electronics can apply electrical energy to the contact pads. Suitable electronics for operating the above modulators can include a controller. A suitable controller includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics. A general-purpose processor may be a microprocessor, but in the alternative, the controller may include or consist of any conventional processor, microcontroller, or state machine. A controller may also be implemented as a combination of computing devices, e.g., a combination of a DSP and a microprocessor, a plurality of microprocessors, one or more microprocessors in conjunction with a DSP core, or any other such configuration.

The electronics can optionally include a memory in communication with the controller. The electronics can store data for executing the functions of the electronics in the memory. The memory can be any memory device or combination of memory devices suitable for read and/or write operations.

In some instances, the electronics include a computer-readable medium in communication with the controller. The computer-readable medium can have a set of instructions to be executed by the controller. The controller can read and execute instructions included on the computer-readable medium. The controller executes the instructions such that the electronics perform one or more of the described functions. The computer-readable medium cab be different from the memory or can be the same as the memory. Suitable computer-readable media include, but are not limited to, optical discs such as CDs, magnetic storage diskettes, Zip disks, magnetic tapes, RAMs, and ROMs. Some functions of the electronics may be executed using hardware as opposed to executing these functions in firmware and/or software.

The method of FIG. 4A through FIG. 14 can be adapted to form the other embodiment disclosed above. For instance, the structure of FIG. 1G can be generated by performing the second etch through the electro-absorption medium 27 positioned on either side of the ridge 22, and through the underlying light-transmitting medium 18 down to the base 20. Alternately, the structure of FIG. 1H can be generated by stopping the second etch before etching through the electro-absorption medium 27 positioned on either side of the ridge 22, and leaving a layer of the electro-absorption medium 27 on the underlying light-transmitting medium 18.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
    a waveguide on a base, the waveguide configured to guide a light signal through a light-transmitting medium; and
    a modulator positioned on the base,
        the modulator including an electro-absorption medium having lateral sides that each extends between a top side and a bottom side, the bottom side being between the base and the top side,
        the electro-absorption medium configured to receive at least a portion of the light signal from the light-transmitting medium in the waveguide,
        the light-transmitting medium and the electro-absorption medium being different materials,
        field sources configured to serve as sources of an electrical field in the electro-absorption medium,
        the electro-absorption medium being a medium in which the Franz-Keldysh effect occurs in response to the formation of the electrical field in the electro-absorption medium,
        the field sources each being a doped region of the electro-absorption medium and the field sources each contacting one of the lateral sides and the lateral sides that are contacted by the field sources being on opposing sides of the electro-absorption medium.

2. The device of claim 1, wherein each of the lateral sides contacted by one of the field sources is perpendicular to the base.

3. The device of claim 1, wherein the light-transmitting medium and the electro-absorption medium contact one another at an interface, the interface being configured such that the light signal travels through the interface, the interface being at a non-perpendicular angle relative to a direction of propagation of the light signals through the waveguide at the interface.

4. The device of claim 3, wherein the angle is between 80° and 89°.

5. The device of claim 1, wherein a seed portion of the light-transmitting medium is positioned between the electro-absorption medium and the base, and
    the electro-absorption medium contacts the seed portion of the light-transmitting medium.

6. The device of claim 1, wherein each of the field sources spans a distance between a top of the lateral side contacted by the field source and the bottom of the lateral side contacted by the field source.

7. The device of claim 1, wherein each of the field sources extends from a top of the lateral side contacted by the field source toward the base.

8. The device of claim 1, wherein each of the field sources extends toward the base from a location that is above 90% of a distance between a top of the lateral side contacted by the field source and the bottom of the lateral side contacted by the field source.

9. The device of claim 1, wherein each of the field sources extends toward the base from a location that is within 1 µm of a top of the lateral side.

10. The device of claim 1, wherein the waveguide includes a horizontal taper positioned such that the waveguide travels directly from the taper to the modulator.

11. The device of claim 1, wherein the modulator includes a ridge extending from slab regions positioned on opposing sides of the ridge and the electro-absorption medium being included in the ridge and also in the slab regions.

12. The device of claim 11, wherein the doped regions are positioned on opposing sides of the ridge.

13. The device of claim 11, wherein the electro-absorption medium included in each slab region is continuous with the electro-absorption medium included in the ridge.

14. The device of claim 11, wherein one or more of the doped regions is included in both the ridge and one of the slab regions.

15. The device of claim 11, wherein one or more electrical contacts is positioned on the electro-absorption medium included in one of the slab regions.

16. The device of claim 11, wherein electrical contacts are each positioned on the electro-absorption medium included in one of the slab regions such that the ridge is positioned between the electrical contacts.

* * * * *

UNITED STATES PATENT AND TRADEMARK OFFICE
CERTIFICATE OF CORRECTION

PATENT NO. : 8,346,028 B2
APPLICATION NO. : 12/653547
DATED : January 1, 2013
INVENTOR(S) : Dazeng Feng et al.

Page 1 of 1

It is certified that error appears in the above-identified patent and that said Letters Patent is hereby corrected as shown below:

In the Specifications:

Column 1, Line 4, insert

--This invention was made with Government support under Agreement No. HR0011-08-9-0001 awarded by DARPA. The Government has certain rights in this invention.--

Signed and Sealed this
Fourth Day of June, 2013

Teresa Stanek Rea
*Acting Director of the United States Patent and Trademark Office*